United States Patent Office 3,383,229
Patented May 14, 1968

3,383,229
ACID EMULSION PASTES
Jean Conort, Bretteville-sur-Odon, France, assignor to Esso Standard Societe Anonyme Francaise, Paris, France, a body corporate
No Drawing. Filed July 17, 1963, Ser. No. 295,796
7 Claims. (Cl. 106—277)

This invention relates to novel paste compositions of emulsions of hydrocarbon binding agents and clay gels, which pastes are suitable as mastics, linings and interlinings, coatings, including aggregate coatings, adhesives and insulating agents, to processes for preparing such compositions and pastes, and to compositions of such pastes with inert fillers, such as mineral aggregates.

Acid emulsions of hydrocarbon binding agent have previously been prepared for use for instance as coating agents for mineral aggregates. Such emulsions are prepared of dispersing the hydrocarbon binding agent in an aqueous phase containing a cationic surface-active agent, for instance a nitrogen-containing base compound, and an acid, which may be an organic acid such as acetic or formic acid, or a strong mineral acid.

The invention consists in a pasty composition of an emulsion of a hydrocarbon binding agent, a clay gel and water.

The compositions may be prepared by mixing intimately together proportions of a clay gel, water, a hydrocarbon binding agent, and an emulsifier, preferably an acid salt or soap of a cationic surface active agent, or corresponding proportions of free acid and the basic cationic surface active agent.

The proportions of constituents used may vary within wide limits depending on the particular clay gel and hydrocarbon binding agent used, and the required consistency of the final paste. Suitable pastes may for instance be obtained using a clay gel containing from 2 to 15% of water, 50 to 150 wt. percent of water, based on the gel, from 2 to 15%, particularly 5 to 8% by weight based on the gel, of the soap or salt of the basic cationic surface-active agent, and a proportion of hydrocarbon binding agent to provide in the final pasty emulsion from 40 to 60 wt. percent thereof, based on the total composition.

A preferred method of preparing the paste according to the invention is to incorporate the acid soap or salt of the cationic basic surface-active agent, or the constituent acid and surface-active agent, together with water, into the clay gel, and thereafter to gradually mill or otherwise mix the hydrocarbon binding agent into the mass to obtain a pasty emulsion.

An alternative method of preparing the pastes according to the invention is to incorporate in the clay gel an acid emulsion of the hydrocarbon binding agent as hereinbefore described.

The water swelling clay used in the compositions according to the invention are well known natural clays, which have the property of swelling to a clay gel with the addition of water of gelation. They are generally montmorillonite clays, or montmorillonite-containing clays, including montmorillonite, beidellite, montronite, hectorite, saponite, and sauconite. The most readily-available swelling clays are the bentonite clays. A modification of the bentonite clays which are suitable for use according to the invention are provided by acid-treating the clays. The bentonite clays may also be treated with an aliphatic or aromatic amine salt to provide commercially-available bentonite/amine complexes. Certain attapulgites and sepiolites may also display gelling properties and thus may be suitable for use in the invention.

The soap or salt of the cationic base surface-active agent used according to the invention are also well-known, particularly in their use to provide aqueous acid emulsions of hydrocarbon binding agents, and are provided by associating a cationic base surface-active agent as hereinafter described with formic or acetic acid, or with a strong mineral acid, particularly hydrochloric acid.

Cationic basic surface-active agents which may be used include basic nitrogen-containing compounds described in "Surface Active Agents" by Schwarz-Perry-Interscience Publishers Inc., 1949, edition, pages 151–200. Particularly useful emulsifiers are quaternary ammonium compounds, primary, secondary, or tertiary aliphatic amines containing from $C_8$–$C_{24}$ carbon atoms per molecule, and which include monoamines and polyamines, and such polyamines which have been reacted with one or more molecules of ethylene or propylene oxide, and also amido amines and amino amines. Phosphines may also be used as the basic cationic surface-active agent.

The hydrocarbon binding agent used to prepare the pasty emulsions according to the invention include bitumen and asphalt, and the oxidized product thereof, and cutbacks thereof with hydrocarbon oils, petroleum, coal and wood tars and road oils.

The invention may be further understood by referring to the following examples.

Example 1

A clay gel was prepared by mixing 24 parts by weight of bentonite with 80 parts by weight of water. The mixture was left for 1 hour to swell to a gel.

500 parts by weight of the gel were placed in a paddle mixer, and 30 parts by weight of a polyamine chloride were added. The said polyamine chloride was obtained by reacting 10 parts by weight of octadecylamino-3-propyl-amine with 90 parts by weight of a 30% solution of hydrochloric acid. Also placed in the mixer were 400 parts by weight of water, at a temperature of 80° C.

The mixer was started up, and 1000 parts by weight of a bitumen, obtained from a South American crude and having an ASTM penetration of 180/220 at 25° C., were gradually added.

The product obtained after thorough mixing was 1930 parts by weight of a pasty mass having the consistency of a thick grease, and containing 51.3% by weight of bitumen.

The emulsion paste so obtained was found to be easily spread with a spatula as a 1 cm. thick layer on a vertical wall of cement mortar, to which it readily adhered.

A mixture of 17 parts by weight of the emulsion paste and 83 parts by weight of sand provided a useful composition with which to spread on a path, providing good resistance to attrition.

Example 2

A bituminous acid emulsion was obtained by dispersing in a centrifugal pump 650 parts by weight of a South American bitumen of ASTM penetration of 180/220 at 25° C. in 350 parts by weight of water with the aid of 10 parts by weight of octadecylamino-3-propylamine and 15 parts by weight of hydrochloric acid solution of 22° Bé. density.

500 parts by weight of a clay gel was prepared as described in Example 1, to which 30 parts by weight of the 22° Bé. HCl were added. 1800 parts by weight of the bitumen acid emulsion were then gradually added at a temperature of 150° C., the mixture being constantly stirred.

The product thus obtained was a bitumen emulsion paste containing 50.1% by weight of bitumen, and having the consistency of a thick grease.

What is claimed is:
1. A paste composition comprising an emulsion of a clay gel, from 50 to 150 wt. percent based on the clay gel, of water, from 2 to 15 wt. percent based on the clay gel, of the salt of a basic cationic emulsifying agent and from 40 to 60 wt. percent, based on the total composition of a hydrocarbon binding agent.

2. A composition as claimed in claim 1 in which the hydrocarbon binding agent is a bitumen.

3. A composition as claimed in claim 1 in which the clay gel is a bentonite gel obtained by treating a bentonite clay with water.

4. A composition as claimed in claim 1 in which the salt of the emulsifying agent is the hydrochloric acid salt of an aliphatic amine.

5. A paving composition as defined by claim 1 and mineral aggregates.

6. A paving composition as claimed in claim 5 in which the mineral aggregates constitute a sand.

7. A coated surface comprising a substrate supporting a layer of the paste composition claimed in claim 1.

References Cited

UNITED STATES PATENTS

| | | | |
|---|---|---|---|
| 2,623,852 | 12/1952 | Peterson | 252—28 |
| 2,706,688 | 4/1955 | Sommer et al. | 106—277 X |
| 2,733,159 | 1/1956 | Scoggin et al. | 106—277 |
| 2,782,169 | 2/1957 | Brown et al. | 106—277 X |
| 2,805,954 | 9/1957 | Fair | 106—281 X |
| 2,889,230 | 6/1959 | Christie | 106—277 |
| 2,901,369 | 8/1959 | Pordes | 106—273 X |

FOREIGN PATENTS 792,648   4/1958   Great Britain.

ALEXANDER H. BRODMERKEL, *Primary Examiner.*

J. B. EVANS, *Assistant Examiner.*